(12) United States Patent
Dieckmann

(10) Patent No.: US 8,109,209 B2
(45) Date of Patent: Feb. 7, 2012

(54) METHOD AND APPARATUS FOR REDUCING THE NUMBER OF MICROBES DURING TANDEM OPERATION

(76) Inventor: Peter Dieckmann, Kaltenkirchen (DE); Stephan Dieckmann, legal representative, Kaltenkirchen (DE); Bianca Dieckmann, legal representative, Kaltenkirchen (DE); Graciela Dieckmann, legal representative, Kaltenkirchen (DE)

( * ) Notice: Subject to any disclaimer, the term of this patent is extended or adjusted under 35 U.S.C. 154(b) by 783 days.

(21) Appl. No.: 12/067,036

(22) PCT Filed: Sep. 8, 2006

(86) PCT No.: PCT/EP2006/008762
§ 371 (c)(1),
(2), (4) Date: Aug. 8, 2008

(87) PCT Pub. No.: WO2007/031236
PCT Pub. Date: Mar. 22, 2007

(65) Prior Publication Data
US 2008/0299274 A1    Dec. 4, 2008

(30) Foreign Application Priority Data

Sep. 17, 2005    (DE) .................. 10 2005 044 536

(51) Int. Cl.
*A01J 11/00* (2006.01)
*A23L 3/16* (2006.01)
(52) U.S. Cl. ............... 99/468; 426/521; 137/266
(58) Field of Classification Search .......... 99/467, 99/468, 472–474, 483; 426/520–521; 137/256, 137/263, 266
See application file for complete search history.

(56) References Cited

U.S. PATENT DOCUMENTS

| | | | | |
|---|---|---|---|---|
| 510,757 | A | * | 12/1893 | Nixon .................. 202/185.5 |
| 1,524,051 | A | * | 1/1925 | Nixon ...................... 426/621 |
| 3,721,527 | A | * | 3/1973 | Lodige et al. ............. 422/36 |
| 3,754,466 | A | * | 8/1973 | Taralli et al. ............. 99/348 |
| 3,835,762 | A | * | 9/1974 | Rambaud .................. 99/483 |
| 4,238,997 | A | * | 12/1980 | Hengstenberg ........... 99/483 |
| 4,255,459 | A | | 3/1981 | Glen |
| 4,478,862 | A | * | 10/1984 | Greethead ................ 426/450 |
| 4,844,933 | A | * | 7/1989 | Hsieh et al. .............. 426/521 |

(Continued)

FOREIGN PATENT DOCUMENTS

DE    3643366    6/1988

(Continued)

OTHER PUBLICATIONS

International Search Report issued in International application No. PCT/EP2006/008762 mailed Nov. 6, 2006.

(Continued)

*Primary Examiner* — Stephen L. Blau
(74) *Attorney, Agent, or Firm* — Lempia Summerfield Katz LLC

(57) ABSTRACT

The invention relates to a method and an apparatus (2) for reducing the microbial count in particulate bulk material, in particular herbs and spices and other particulate foodstuffs, by treating batches of the bulk material with hot steam. In order to make better use of the thermal energy contained in the steam, the invention proposes that the bulk material is in each case alternately treated with steam in two separate chambers (6, 8), and that, after treatment of the bulk material in a chamber (6 or 8), some of the steam which is supplied to this chamber (6 or 8) is introduced into the other chamber (8 or 6) in order to preheat the still untreated bulk material in said other chamber (8 or 6).

17 Claims, 2 Drawing Sheets

U.S. PATENT DOCUMENTS

| | | | | |
|---|---|---|---|---|
| 4,962,700 | A | * | 10/1990 | Skobic et al. .................... 99/470 |
| 6,120,822 | A | * | 9/2000 | Denvir et al. .................. 426/320 |
| 2005/0249650 | A1 | * | 11/2005 | Damhuis et al. ............. 422/295 |

FOREIGN PATENT DOCUMENTS

| | | |
|---|---|---|
| DE | 19814259 | 10/1999 |
| EP | 0 518 828 | 12/1992 |
| EP | 803203 | 10/1997 |
| EP | 1 120 050 | 8/2001 |
| JP | 2002027958 | 1/2002 |
| WO | WO 96/20606 | 7/1996 |

OTHER PUBLICATIONS

International Search Report issued in International application No. PCT/EP2006/008762 mailed Nov. 6, 2006.

* cited by examiner

METHOD AND APPARATUS FOR REDUCING THE NUMBER OF MICROBES DURING TANDEM OPERATION

RELATED APPLICATION DATA

This U.S. National Phase Application is based on and claims priority benefit of international application no. PCT/EP2006/008762 filed on Sep. 8, 2006, which claimed priority benefit of German national patent application no. 10 2005 044 536.5 filed on Sep. 17, 2005.

BACKGROUND

1. Field of the Invention

The invention relates to a method and an apparatus for reducing the number of microbes in particulate bulk material, in particular, in spices and herbs and other particulate foodstuffs by treating batches of the bulk material with hot steam.

2. Description of the Related Art

From the applicant's EP 1 120 050 A2, there is already known a method and an apparatus for reducing the number of microbes in particulate bulk material by treating a batch of the bulk material in a container with hot steam. After the steam has been inside the container for a period set in advance, needed for the desired reduction in the number of microbes, the steam is released from the container and the pressure reduced. In the process, the heat energy still in the steam is released to the environment.

DE 36 43 366 C2 and EP 0 803 203 A2 already provide a method and an apparatus to reduce the number of microbes in particulate bulk material in accordance with the pre-characterizing part of Claims 1 and 7, respectively.

SUMMARY

Building on this, the invention has the task of better use of the heat energy in the steam in a method and an apparatus of this type.

Using the invention's features, the bulk material is treated alternately in two separate chambers with steam, with part of the steam remaining in a chamber after the conclusion of the treatment being sent to the other chamber with the bulk material that has not yet been treated, preferably by opening a shutoff valve in a connection conduit set up between the two chambers.

The invention is based on the thought that after the end of the period in which the steam is in the chamber with the heated bulk material, meaning after the treatment for reducing the number of microbes in it, the remaining heat in the steam is used to preheat the bulk material in the other chamber that has not yet been treated.

In a preferred form of the invention, a reduced pressure is applied to the chamber with the untreated bulk material in order to remove the air from the chamber to the extent possible before the steam is introduced from the other chamber. Among other things, this results in steam flowing on its own from the chamber with the bulk material that has just been treated into the previously evacuated chamber with the untreated bulk material when the valve in the connection conduit is opened, due to the difference in pressure between the chambers. In addition, the reduced pressure in the chamber with the untreated bulk material leads to the incoming steam condensing on the surface of the particles of the bulk material. In the process, some of the heat energy in the steam is released as heat of condensation on the particle surfaces, which results in a rapid superficial heating of the particles and thus the desired killing of microbes on the surfaces. Due to the condensation of the steam in the chamber with the untreated bulk material, if the chambers are equal in size, it is not until about half of the remaining steam from the chamber with the treated bulk material has been transferred into the chamber with the untreated bulk material, that there is a pressure equilibrium between the two chambers. It is thereby possible to transfer a large part of the heat contained in the remaining steam into the chamber with the untreated bulk material and use it there for preheating.

The shutoff valve in the connection conduit between the two chambers remains open for this purpose for as long as needed to create equilibrium between the chambers and it is then closed.

According to an advantageous form of the invention, additional heated or fresh steam is then supplied from an external hot steam source into the chamber with the preheated untreated bulk material, but the amount of steam needed is substantially smaller than would be the case without the preceding preheating.

In order to further reduce the amount of additional hot steam or fresh steam to be supplied from the hot steam source, this steam is preferably taken through a steam-jet pump. The reduced pressure created in the steam-jet pump is used to aspirate even more steam out of the chamber with the treated bulk material through a suction line and introduce it into the chamber with the bulk material to be treated along with the additional hot or fresh steam from the hot steam source.

After the pressure is in equilibrium and the steam is aspirated out of the chamber with the treated bulk material, a bulk material outlet of this chamber is opened in order to discharge the bulk material from the chamber.

In order to avoid having bulk material, particularly if it is leafy or particulate, being cooked into a mass when being treated, an advantageous embodiment of the invention has the chambers with the bulk material put in motion during treatment with steam and/or while the reduced pressure is being applied, preferably by having the chambers suspended on leaf-springs to freely oscillate and connected to a vibrator.

BRIEF DESCRIPTION OF THE DRAWINGS

The invention is explained below in further detail based on two embodiments depicted in the figures.

DETAILED DESCRIPTION OF THE DISCLOSURE

Figure 1:
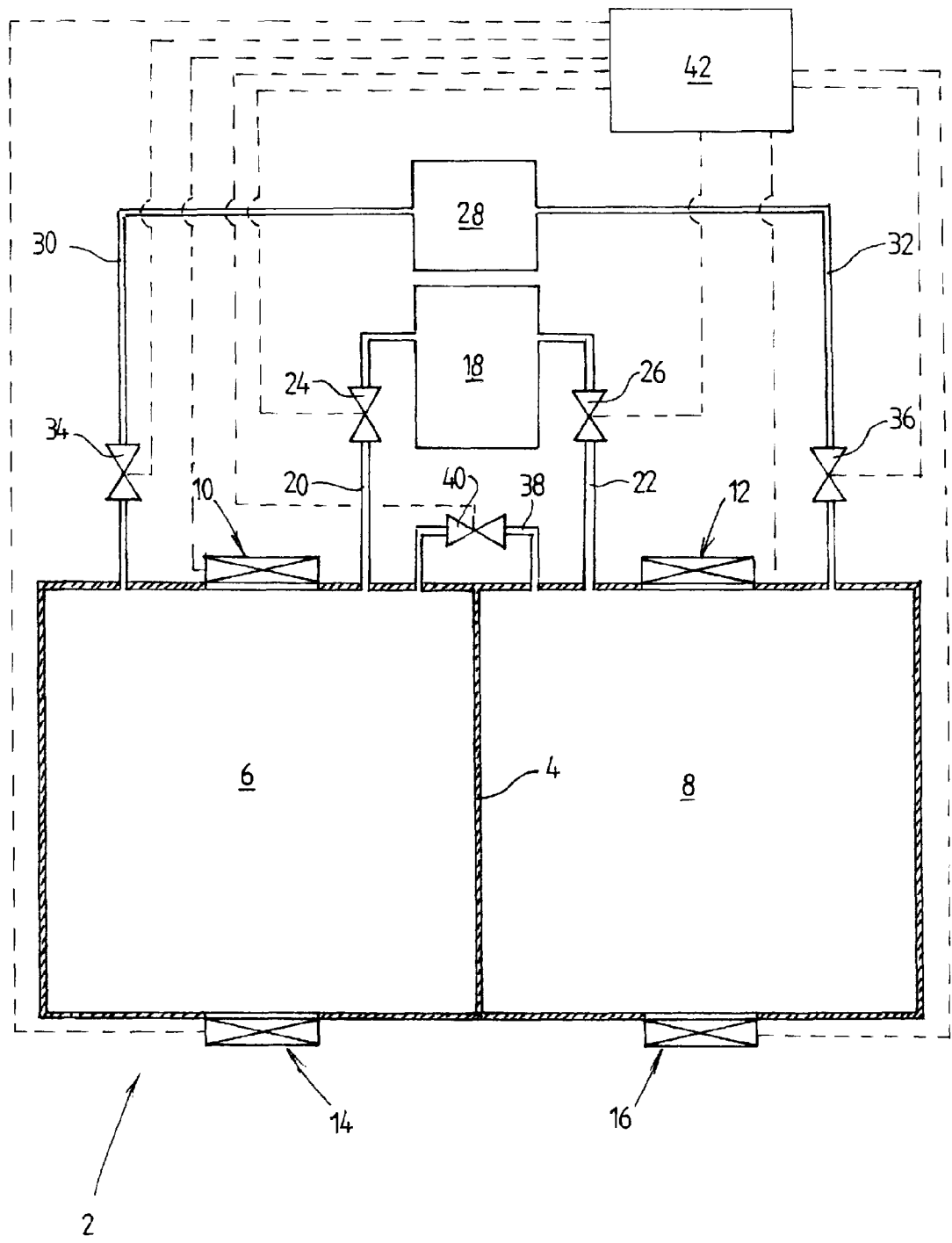
FIG. 1 shows a schematic cross section of an apparatus for reducing the number of microbes according to the invention.

As the drawing shows in a simplified form, apparatus 2 according to the invention for reducing the number of microbes in a product consisting of spices or herbs that can be moved in bulk and/or pneumatically (not shown), includes two pressure-resistant heat insulated chambers 6, 8 placed next to one another and separated by a separating wall 4, each of which has a tightly sealable product inlet, 10 and 12, on top and a tightly sealable product outlet, 14 and 16 respectively, on the bottom. Apparatus 2 also includes a steam generator 18 which is connected to left chamber 6 by a first fresh steam conduit 20 and to right chamber 8 by a second fresh steam conduit 22. Each of the two fresh steam conduits, 20 and 22, contains a shutoff valve, 24 and 26, respectively. In addition, apparatus 2 comprises a reduced pressure source 28 that is connected to left chamber 6 by first reduced pressure conduit 30 and to right chamber 8 by second reduced pressure conduit 32. Each of the two reduced pressure conduits contains a shutoff valve, 34 and 36 respectively. In addition, apparatus 2 in FIG. 1 has a connection conduit 38 between the left and the right chambers, 6 and 8, respectively, and the connection conduit also contains a shutoff valve 40. A control mechanism 42 connected to valves 24, 26, 34, 36, product inlets 10, 12 and product outlets 14, 16 regulates the time sequence for opening and closing valves 24, 26, 34, 36, product inlets 10, 12 and product outlets 14, 16.

The two chambers 6, 8 can be placed next to each other inside a container, suspended on leaf springs (not depicted) to freely oscillate, with the container being moved back and forth horizontally by a vibrator as described in the applicant's EP 1 120 050 A2 mentioned at the beginning.

In order to reduce the number of microbes in products that can be packaged in bulk in the apparatus in FIG. 1, with product outlet 14 closed, a batch of the product is initially supplied through open product inlet 10 into left chamber 6 and then product outlet 10 is closed. Then shutoff valve 34 in reduced pressure conduit 30 is opened by control mechanism 42, and the reduced pressure of reduced pressure source 28 is applied to chamber 6, thus aspirating as much air as possible from chamber 6. Then shutoff valve 34 is closed and then shutoff valve 24 in fresh steam conduit 20 is opened in order to introduce hot saturated steam from steam generator 18 into chamber 6. Due to the expansion, some of the hot steam introduced condenses upon its entry into chamber 6 on the surface of the product, the latter being superficially heated to temperatures that ensure that the microbes adhering on it are killed.

Before or during the time the steam is in left chamber 6 for the period previously computed as needed to reduce the number of microbes, right chamber 8 is filled with product through product inlet 12 and after closing product inlet 12, a reduced pressure is applied to chamber 8 by opening shutoff valve 36 in reduced pressure conduit 32. The time for supplying chamber 8 with the product and for subjecting this chamber 8 to reduced pressure is synchronized with the steam treatment of the product in left chamber 6 such that the air is evacuated from right chamber 8 shortly before the end of the residence time planned for the steam in left chamber 6, and shutoff valve 36 in the reduced pressure conduit 32 can be closed again. Immediately after the end of the planned residence time of the steam in the left chamber 6, the shutoff valve 40 in the connecting line 38 is opened, so that due to the pressure difference between chambers 6, 8, steam flows from left chamber 6 into right chamber 8. The steam flowing into chamber 8 expands and some of it condenses on the surface of the product, heating it from the heat of condensation. As a result of the condensation of the steam in right chamber 8, more steam flows from left chamber 6 into right chamber 8, so that if the chambers are of the same size, a pressure equilibrium does not occur until the pressure is substantially below that in chamber 6 at the time when shutoff valve 40 is opened. This makes it possible to take a relatively large part of the heat in the steam remaining in chamber 6 after the residence time spent there into the other chamber 8 in order to preheat the still untreated product in this chamber 8.

As soon as there is pressure equilibrium between chambers 6 and 8, shutoff valve 40 in connecting conduit 38 is closed and then product outlet 14 in chamber 6 is opened in order to discharge the heated product from chamber 6. At the same time, shutoff valve 26 in fresh steam conduit 22 of chamber 8 is opened in order to supply as much hot steam from steam generator 18 into the preheated product in chamber 8 as needed to reduce the number of microbes sufficiently.

Chamber 6, which was previously emptied, is refilled with product through open product inlet 10 after product outlet 14 is closed, and after product inlet 10 is closed, it is again evacuated as described above. After the planned residence time of the steam in right chamber 8, shutoff valve 40 can again be opened in order to introduce some of the steam from right chamber 8 with the product that was just treated into left chamber 6 in order to preheat the product in that chamber that has not yet been treated. After pressure equilibrium is reached, shutoff valve 40 is again closed and right chamber 8 is emptied through product outlet 16, while additional fresh steam is introduced into left chamber 6 by opening shutoff valve 24.

This procedure is repeated in cycles in which the two product inlets 10 and 12, the two product outlets 14 and 16 and the shutoff valves 24, 26, 34, 36 and 40 are opened and closed by control mechanism 42 depending on the circumstances as described.

Figure 2:
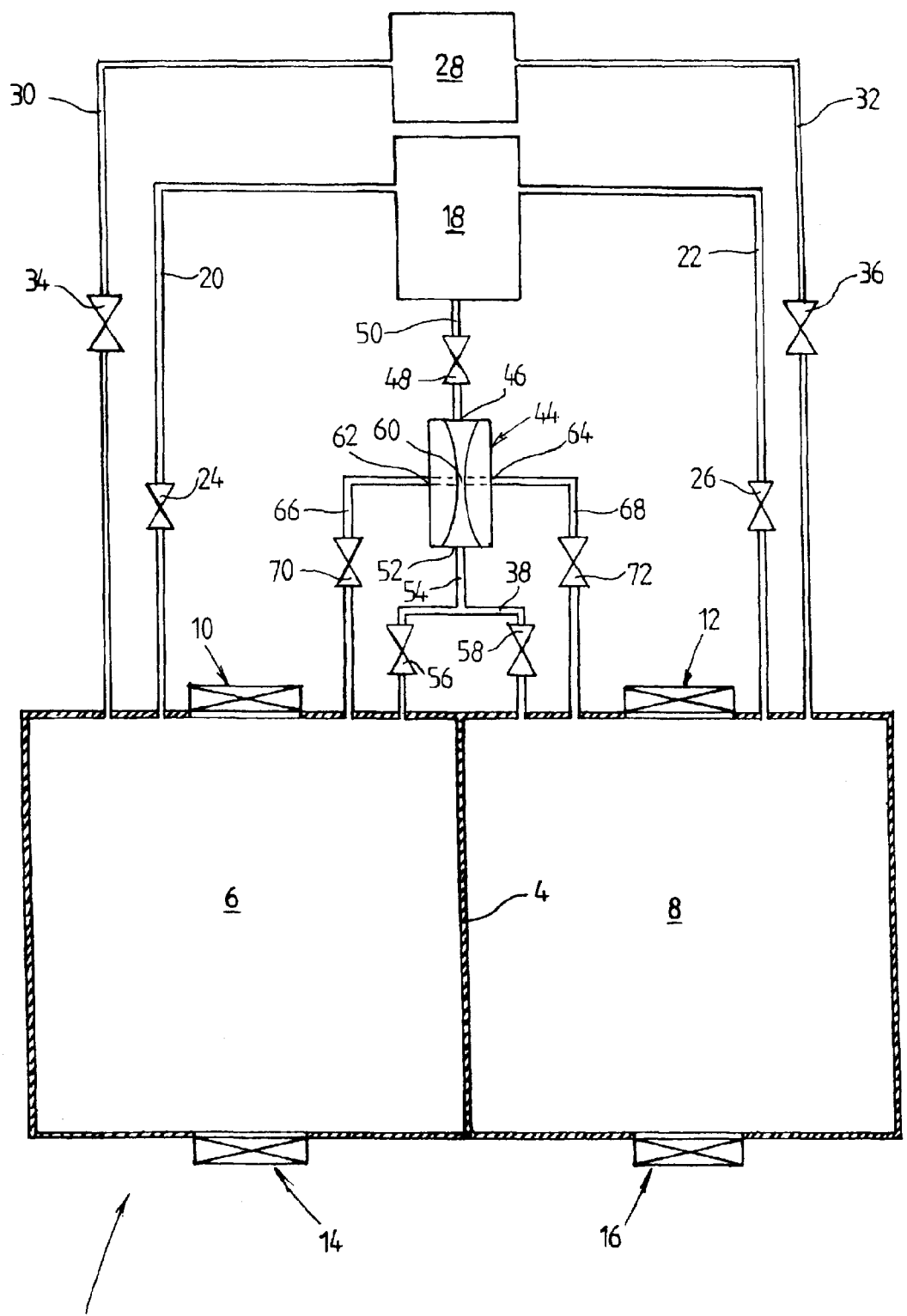
FIG. 2 shows a schematic cross section of a further apparatus for reducing the number of microbes according to the invention.

In order to reduce the amount of hot steam needed from the steam generator, the apparatus 2 depicted in FIG. 2 also includes a steam-jet pump 44, whose intake 46 is connected to the external source of steam 18 through a steam feed conduit 50 provided with a shutoff valve 48. Output 52 of steam-jet pump 44 is connected through steam conduit 54 to connection conduit 38 between chambers 6 and 8, which in apparatus 2 in FIG. 2 contains a shutoff valve, 56 and 58 respectively, on either side of the connection point. Steam-jet pump 44, also called an injector, has a passage with a reduced cross section 60 and two suction connections 62, 64 opening onto the narrowing at which a reduced pressure is created in a known manner by routing the steam trough the reduced cross section. This reduced pressure can be applied to either chamber 6 or 8 through two suction conduits 66 and 68 opening out into chambers 6 and 8 respectively by opening shutoff valve 70 or 72 in conduits 66 or 68 respectively.

Steam-jet pump 44 can always be taken into operation if hot steam is supplied from steam generator 18 into chamber 6 or chamber 8.

If, for example, hot steam is supplied from steam generator 18 to right chamber 8, after the steam has been introduced from left chamber 6 with valves 56 and 58 open into right chamber 8 and pressure equilibrium has been created between chambers 6 and 8, valve 56 is closed, valves 48 and 70 are opened, and valve 72 remains closed. In this way, additional steam is aspirated from chamber 6 through suction conduit 66 by means of the reduced pressure created at the reduced cross section 60 of pump 44 which is then supplied together with the hot steam from the steam generator 18 through conduits 54 and 38 into chamber 8.

On the other hand, steam can be aspirated from right chamber 8 into left chamber 6 by closing valves 58 and 70 and opening valves 48, 56 and 72 in order to introduce more steam from chamber 8 to the still untreated product in this chamber 6 along with the additional hot steam from hot steam source 18.

Product outlets 14 and 16 of chambers 6 and 8 respectively with the treated bulk material will not be opened here in order to discharge the bulk material from chambers 6 and 8 until after the steam has been aspirated.

If it is no longer desired that steam be aspirated with steam-jet pump 44, conduits 20 and 22 with shutoff valves 24 and 26, respectively, can be used to supply hot steam from steam generator 18 to chambers 6 and 8.

In lieu of a single steam-jet pump 44, two steam-jet pumps (not depicted) can be provided, one of them being disposed in a steam conduit provided with a shutoff valve between steam generator 18 and left chamber 6 and being connected to chamber 8 by a suction conduit with a shutoff valve, and the other one being disposed in a steam conduit provided with a shutoff valve between steam generator 18 and the right chamber 8 and being connected to left chamber 6 via a suction conduit with a shutoff valve.

As previously indicated with reference to the apparatus in FIG. 1, the procedure described above and synchronized with the filling and emptying of the chambers can be repeated in cycles. Product inlets 10 and 12, product outlets 14 and 16 and shutoff valves 24, 26, 34, 36, 48, 56, 58, 70 and 72 are controlled as in the apparatus in FIG. 1 through a control unit, that, however, is not shown in FIG. 2 for reasons of clarity as is the case with the control lines leading from the control mechanism to product inlets 10 and 12, product outlets 14 and 16 and shutoff valves 24, 26, 34, 36, 48, 56, 58, 70 and 72.

The invention claimed is:

1. A method to reduce the number of microbes in particulate bulk material, the method comprising the steps of:
    providing two separate chambers;
    placing a batch of the bulk material in each of the two separate chambers;
    treating batches of the bulk material with steam alternately in the two separate chambers; and
    moving part of the steam introduced into one chamber of the two separate chambers to the other chamber of the two separate chambers after treating the bulk material in the one chamber.

2. A method based on claim 1, including the step of applying a reduced pressure to the other chamber of the two separate chambers prior to moving steam from the one chamber of the two separate chambers into the other chamber of the two separate chambers.

3. A method based on claim 1, including the step of moving steam from one of the two separate chambers into the other of the two separate chambers until pressure equilibrium is attained between the two separate chambers.

4. A method based on claim 1, including the step of introducing additional steam supplied from an external steam source into one of the two separate chambers after steam has been introduced from the other of the two separate chambers into the one chamber.

5. A method based on claim 4, including the steps of:
    providing a steam-jet pump;
    introducing the additional steam through the steam-jet pump; and
    aspirating steam from one of the two separate chambers into the steam-jet pump and together with the additional steam from the external steam source into the other of the two separate chambers by a reduced pressure created in the steam-jet pump during the introduction of the additional steam through the steamjet pump.

6. A method based on claim 1, including the step of putting the two separate chambers in vibratory motion during treatment with steam and/or during application of reduced pressure.

7. An apparatus for reducing the number of microbes in particulate bulk material by batch processing of the bulk material with steam, the apparatus comprising:
    two separate chambers that can be loaded with bulk material and unloaded in batches, the chambers being alternately connectable to an external steam source for introducing steam into the chambers; and
    a connection device for connecting the two separate chambers after treatment of a batch of the bulk material in one chamber with steam introduced from the steam source into the one chamber and for moving part of the steam introduced into the one chamber to the other chamber.

8. An apparatus based on claim 7, wherein the connection device is a connection conduit having at least one shutoff valve.

9. An apparatus based on claim 7, further comprising at least one steam-jet pump disposed between the steam source (18) and the two chambers (6, 8), the steam-jet pump being connected by a suction conduit, which is normally closed, to one of the two separate chambers.

10. An apparatus based on claim 9, wherein the connection device moves additional steam from the steam source through the steam-jet pump into one of the two separate chambers and opens the closed suction conduit between the steam-jet pump and the other chamber.

11. An apparatus based on claim 7, further comprising a reduced pressure source that can alternately be connected to the two separate chambers.

12. An apparatus based on claim 7, wherein the connection device regulates the sequence of opening and closing of bulk material inlets and outlets of the two separate chambers of shutoff valves between the two separate chambers (6, 8) and the steam source or the reduced pressure source respectively of at least one shutoff valve in the connection device, and of additional shutoff valves in suction conduits between the steam-jet pump and the two separate chambers.

13. An apparatus based on claim 7, wherein the two separate chambers are movably suspended and connected with a vibrator.

14. A method based on claim 1, wherein the bulk material is spices, herbs, or other particulate foodstuffs.

15. An apparatus based on claim 7, wherein the bulk material is spices, herbs, or other particulate foodstuffs.

16. An apparatus based on claim 7, wherein the connection device includes a normally closed connection conduit or connection opening between the two separate chambers.

17. An apparatus based on claim 7, wherein the connection device includes a control mechanism.

\* \* \* \* \*